United States Patent [19]

Covington et al.

[11] Patent Number: 5,343,677
[45] Date of Patent: Sep. 6, 1994

[54] METHOD AND SYSTEM FOR MOUNTING AND SUPPORTING ROW UNITS ON AN AGRICULTURAL IMPLEMENT

[75] Inventors: Michael J. Covington, LaGrange; George H. Hale, Naperville, both of Ill.

[73] Assignee: Case Corporation, Racine, Wis.

[21] Appl. No.: 990,688

[22] Filed: Dec. 15, 1992

[51] Int. Cl.⁵ ............................................. A01D 46/08
[52] U.S. Cl. ...................................... 56/10.2 F; 56/28; 56/DIG. 2; 56/DIG. 15
[58] Field of Search .......... 56/10.2 F, 28, 37, DIG. 2, 56/DIG. 15, 10.2 R

[56] References Cited

U.S. PATENT DOCUMENTS

| | | | |
|---|---|---|---|
| 4,803,830 | 2/1989 | Junge et al. | 56/28 |
| 4,896,492 | 1/1990 | Junge et al. | 56/28 |
| 5,010,718 | 4/1991 | Covington et al. | 56/10.2 X |
| 5,019,983 | 5/1991 | Schutten et al. | 56/28 X |
| 5,081,828 | 1/1992 | Covington et al. | 56/28 |
| 5,105,609 | 4/1992 | Covington et al. | 56/13.5 |
| 5,181,572 | 1/1993 | Anderson et al. | 56/10.2 X |

OTHER PUBLICATIONS

Computerized Steering Control for John Deere Cotton Stripper, "Outstanding Innovations in Product or Systems Technology," *Agricultural Engineering*, Sep. 1992, p. AE 50/14.

*Primary Examiner*—Terry Lee Melius
*Attorney, Agent, or Firm*—Rudnick & Wolfe

[57] ABSTRACT

A system for mounting row units on an agricultural implement suited for movement across a field. The mounting system comprises a row unit support frame connected to the agricultural implement. The row unit support frame includes a generally horizontal elongated bar on which the row units are individually mounted in laterally adjacent relation relative to each other and such that the row units are prevented from moving fore-and-aft relative to the frame. At least one of the row units is mounted for lateral movement along the bar and relative to the adjacent row unit. An actuator is provided for effecting powered lateral movement of the row unit along the length of the bar. Each actuator is operated under the influence of a sensor which monitors the lateral position of the respective row unit relative to a desirable path on the field and controls operation of the respective actuator to generally align the movable row unit relative to the desirable path. A method for supporting the row units on the bar for lateral movement is also disclosed.

18 Claims, 5 Drawing Sheets

METHOD AND SYSTEM FOR MOUNTING AND SUPPORTING ROW UNITS ON AN AGRICULTURAL IMPLEMENT

FIELD OF THE INVENTION

The present invention generally relates to agricultural equipment and, more particularly, to a harvester having a series of adjacent row units whose lateral positions relative to the rows of plants to be harvested can be adjusted to align the row units with their respective plant rows to facilitate harvesting of the materials and thereby improve overall performance of the harvester.

BACKGROUND OF THE INVENTION

Seed planters are adapted to be drawn behind tractors or the like and are available in various sizes. Some planters have six, eight, or more planter units which are fixed in laterally spaced relation to each other and which are drawn over and across a predetermined swath of a field to plant several rows of plants. The planter is then turned to move over and across an adjacent swath of the field to plant several more rows of plants.

Seed planters typically include a marker which provides a track which is laterally spaced from the outer plant row of the swath over which the planter is presently drawn. When the tractor is turned, the operator attempts to follow the track left by the marker such that the lateral spacing between plant rows of adjacent swathes corresponds to the lateral spacing between adjacent plant rows of a particular swath.

Depending upon the size of the field, a planting operation can span several hours and becomes extremely monotonous for the operator. Requiring a tractor operator to intensely focus and continually follow a dirt track in a vast planting field over a period of several hours is a tenuous task for any person to successfully perform. Accordingly, the tractor operator has been known to vary from the dirt track for relatively short periods of time and then correct the error to continue following the track. When the dirt track is not followed, however, the lateral spacing between plant rows of adjacent swathes vary relative to the fixed lateral spacing between plant rows of a given swath. That plant row which varies in lateral spacing from a plant row of an adjacent planting swath is commonly referred to as a "guess row."

Agricultural harvesters typically include a series of row units mounted to the harvester. An agricultural harvester such as a cotton harvester, for example, includes a plurality of harvesting units arranged at a forward end of the harvester. A row or harvesting unit of a cotton harvester typically includes a housing structure defining a plant passage extending in a fore-and-aft direction and with a harvesting mechanism being housed within the housing structure for harvesting cotton from a row of cotton plants passing through the plant passage.

The harvesting mechanism of a typical cotton picker includes a pair of picker rotors or drums. Each picker rotor or drum is configured to remove cotton from the plants passing through the plant passage. Some manufacturers arrange both of the picker rotors or drums to one side of the plant passage. Other manufacturers arrange the picker drums or rotors on opposite sides of the plant passage of each harvesting unit.

Recent cotton harvesters have been designed with up to five harvesting units supported in side-by-side relation relative to each other across a forward end of the harvester. As the cotton harvester is operated, the operator needs to direct constant and careful attention to see that the harvester is properly steered such that the harvesting or row units are aligned with and the plant rows are directed centrally through the plant passage. Not unlike the human error problems normally encountered during the planting operation, fatigue, boredom, general inattentiveness, and the like often causes the operator to inadvertently direct or steer the harvester such that the plant passage of the harvesting unit is not centered on the plant rows.

In addition to inadvertent operator errors causing the harvester to be directed such that the harvesting units are not positioned in alignment with the plant rows, because the number of harvesting or row units on the harvester does not necessarily equal the number of planter units affixed to the seed planter, the "guess rows" which exist from inadvertent errors in the planting operation cause further problems in the harvesting operation. The operator's inattentiveness to guide the harvester such that the harvesting or row units are centered on the plant rows and the problems associated with "guess row" harvesting adversely affect the ability of the row units to remove cotton from the plants and thereby adversely affect cotton harvester performance.

As will be appreciated, operators' inattention in directing the harvester across the field such that the plant rows move centrally through the plant passage and the problem of effectively removing cotton from the "guess rows" is exacerbated in those cotton harvesters having the picker rotors or drums arranged commonly to one side of the plant passage. A harvester guidance system has been proposed by Ortham Manufacturing, Inc. for aligning the harvester with the plant rows. Primarily because of the size of the harvester, automatic guidance thereof does not readily lend itself to quick and easy steering changes during the harvesting procedure.

Still another problem with harvesters relates to inspection and servicing of the harvesting or row units. The problem results from the close proximity of the units relative to each other when they are arranged in a harvesting or operational position. That is, arranging the harvesting units in adjacent order inhibits access between the units for inspection and servicing which is required as a daily procedure.

Thus, there is a need and a desire for a responsive system which decreases operator fatigue by alleviating the operator of the intense task of constantly maintaining the harvester in alignment with the plant rows while maximizing field efficiency.

SUMMARY OF THE INVENTION

In view of the above, and in accordance with the present invention, there is provided a system for mounting at least two row units on an agricultural implement which is suitable for movement across a field. The mounting system comprises a row unit support frame connected to the agricultural implement. The row unit support frame includes a generally horizontal bar on which the row units are individually mounted in laterally adjacent relation relative to each other and such that the row units are prevented from moving in a fore-and-aft relation relative to the support frame. At least one of the row units is mounted for lateral movement along the bar and relative to an adjacent row unit. An actuator associated with a respective movable harvesting unit is provided for effecting lateral powered movement of the movable row unit along the bar. The motor is operated under the influence of a sensor which monitors the lateral position of the movable row unit relative to a desirable path on the field and controls operation of the motor to generally align the movable row unit relative to the desirable path.

In one form of the invention, the agricultural implement is a cotton harvester, and the row units include harvesting units arranged in side-by-side relation relative to each other. Each harvesting unit includes a harvesting mechanism for removing cotton from plants arranged in generally parallel rows. An actuator associated with each movable harvesting unit effects powered lateral movement of each movable harvesting unit laterally along the bar of the support frame. Moreover, a sensor is mounted on each movable harvesting unit for sensing the lateral position of the movable harvesting unit relative to a respective plant row and for controlling the respective actuator to align the movable harvesting unit with respect to the respective plant row thereby facilitating harvesting of cotton by the harvesting mechanism of the movable harvesting unit.

In a preferred form of the invention, the support frame for the harvesting unit includes a lift assembly connected to and extending from the frame of the harvester to vertically position the generally horizontal bar relative to the harvester frame. The lift assembly includes motors for vertically moving the bar relative to the frame of the harvester and thereby conjointly effecting the elevation of the harvesting units connected to the bar.

Each movable harvesting unit on the bar includes mounting structure connected to and extending upwardly from the harvesting unit. The mounting structure preferably includes rollers for facilitating lateral movement of the harvesting unit along the bar. In one form of the invention, the mounting structure embraces the bar of the support frame to allow for sliding movement of the movable harvesting units therealong.

Any suitable form of actuator can be used for effecting lateral powered movements of each movable harvesting unit. In a preferred embodiment, the actuator includes a hydraulic motor connected between the support frame and each movable harvesting unit. In a most preferred form of the invention, a double-acting hydraulic cylinder is used to move and positively position the movable harvesting unit along the length of the bar.

Each movable harvesting unit further carries a sensor for sensing the lateral position of the harvesting unit relative to the respective plant row passing therethrough. The sensor controls a respective actuator to align the harvesting unit relative to the plant row. In a preferred form, the sensor includes first and second sensor elements arranged on opposite sides of the plant passage defined by the harvesting unit. The first sensor element controls the respective actuator to move the row unit in a first linear direction upon detection of the plant row to one side of the plant passage and the second sensor element controls the respective actuator to move the row unit in an opposite or second linear direction when that second element senses the plant row to that side of the plant passage.

The mounting and supporting system of the present invention further includes a control system for selectively operating those actuators associated with the movable harvesting units in either a service mode or an operational mode. In an operational mode, each actuator laterally and automatically positions the movable row unit relative to a respective row of plants in response to outputs from the sensors mounted on the row units. In a service mode of operation, the movable row unit is laterally moved between an operating position, whereat the row unit is positioned proximate to an adjacent row unit for purposes of harvesting materials from the plants, and a service position, whereat the lateral spacing between adjacent harvesting units is increased to facilitate inspection and servicing of the units.

In a preferred form of the invention, the bar of the support frame is of sufficient length such that a plurality of harvesting units are arranged thereon in inner and outer pairs of harvesting units. The control system includes a first switch for selectively and conjointly moving the inner pair of harvesting units between an operational position and a service position. The control system likewise includes a second switch for selectively and conjointly moving the outer pair of harvesting units laterally along the length of the bar between operational and service positions.

During an operational mode, the sensors sense the lateral position of each movable harvesting unit relative to a respective plant row and automatically align the harvesting unit with respect to that row. An added feature of the present invention is that the actuator used to laterally move the harvesting unit likewise positively positions the harvesting unit along the length of the support frame bar thereby eliminating the need for extra pins and bolts for locking the harvesting unit in place. Aligning the harvesting unit with the respective plant row maximizes field efficiency and effectiveness of the harvesting mechanism in removing cotton from the plants passing through the harvesting unit. Moreover, aligning the harvesting unit relative to the respective plant rows, eliminates the problems regarding "guess rows" appearing throughout the fields and other inadvertent human errors.

As will be appreciated, automatically causing the harvesting units to laterally move relative to the plant rows is considerably easier and more responsive than steering the harvester to compensate for human errors during the planting operation. Another benefit of the present invention is to reduce operator stress by alleviating the operator of the intense task of constantly maintaining the alignment between the harvester and the plant rows. Automatically aligning the row units with the rows rather than requiring the operator or a system to continually steer the harvester through the field may likewise enhance the ground speed during the harvesting operation thus improving harvester efficiency.

Numerous other features and advantages of the present invention will become readily apparent from the following detailed description, the accompanying drawings, and the appended claims.

DETAILED DESCRIPTION OF THE PRESENT INVENTION

Figure 1:
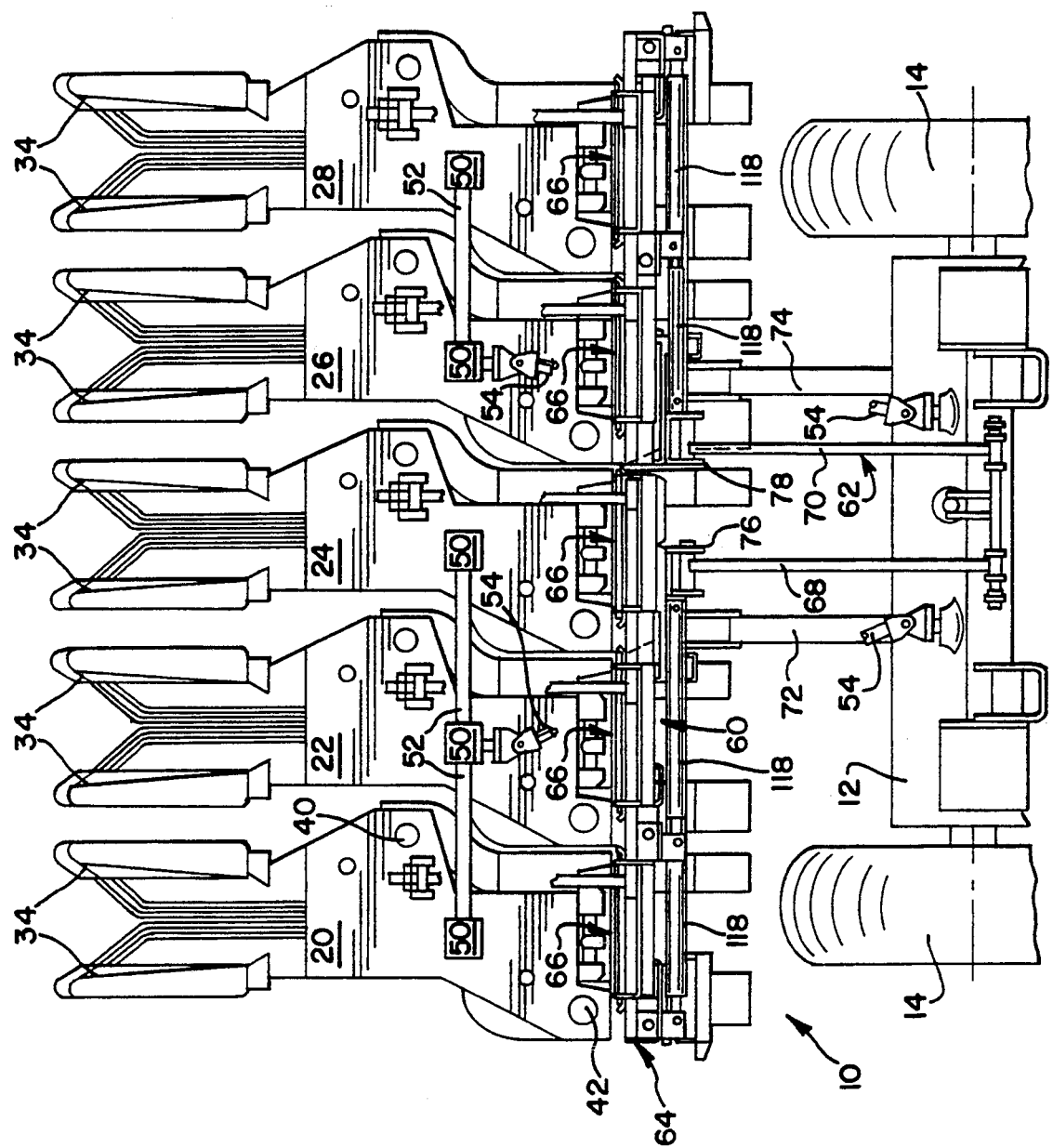
FIG. 1 is a partial top plan view of a cotton harvester illustrating a harvesting unit configuration for harvesting multiple adjacent rows of cotton.

While the present invention is susceptible of embodiment in various forms, there is shown in the drawings a presently preferred embodiment hereinafter described, with the understanding that the present disclosure is to be considered as an exemplification of the invention and is not intended to limit the invention to the specific embodiment illustrated.

Referring now to the drawings, wherein like reference numerals indicate like parts throughout the several views, there is shown an agricultural implement which is depicted only fragmentarily, and as seen is represented in its entirety in FIG. 1 by reference numeral 10. In the illustrated form of the invention, the agricultural implement 10 is in the form of a cotton harvester including a fore-and-aft extending frame 12 mounted on a pair of ground engaging front wheels 14. A pair of steerable rear wheels (not shown) provides the harvester with proper direction.

Positioned forwardly on the frame 12 are a plurality of individual cotton harvesting row units 20, 22, 24, 26, and 28. As illustrated, the harvesting or row units are arranged in a side-by-side relationship for harvesting adjacent and generally parallel rows of cotton. It should be appreciated, however, that this invention equally applies to a different number of harvesting units than that illustrated.

In a preferred form of the invention, each of the harvesting units is substantially similar in structure. Accordingly, only a description of harvesting unit 20 will be provided with the understanding that the other harvesting units are similarly structured.

Figure 2:
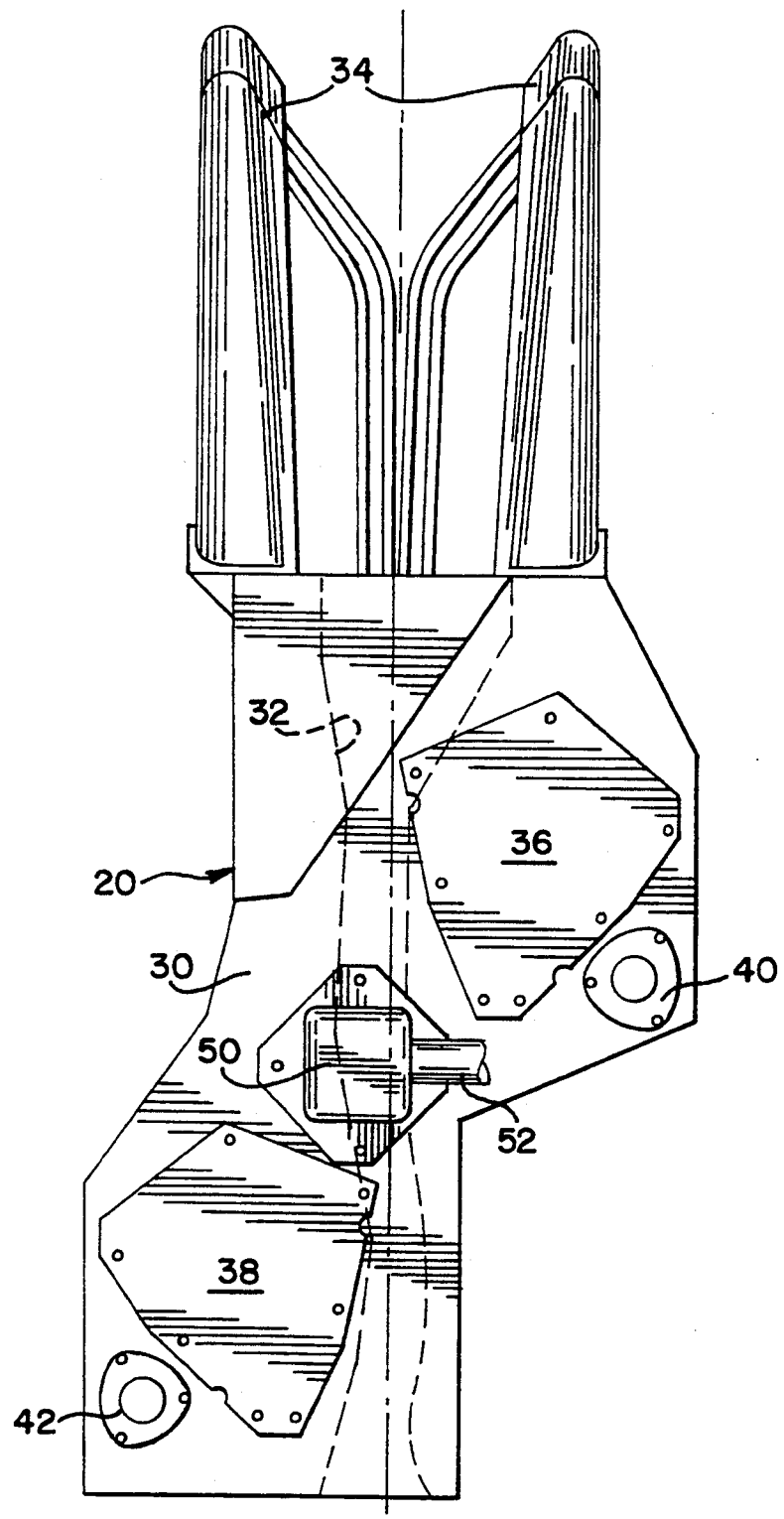
FIG. 2 is a top plan view showing the general configuration of a single harvesting unit.

Turning to FIG. 2, each harvesting unit includes a housing structure 30 defining a fore-and-aft crop receiving opening or plant passage 32. Each harvesting unit is further provided with stalk lifters 34 on either side of opening 32 to guide the row of plants through the opening or passage 32 as the harvester moves across a field.

Each harvesting unit further includes a harvesting mechanism which preferably includes front and rear spindle rotors 36 and 38 and respective doffer structures 40 and 42. In a preferred embodiment, the spindle rotors 36 and 38 are transversely separated by the fore-and-aft plant passage 32. Each row unit supports drive structure indicated generally at 50 for operating the harvesting mechanism. The drive structure 50 for adjacent harvesting units are interconnected by cross drive shafts 52 which receive rotary power from main drive shafts 54.

A row unit support frame, indicated generally by reference numeral 60 in FIG. 1, is supported from the forward end of the main frame 12 and is preferably constructed in accordance with the teachings of U.S. Pat. No. 5,010,718 granted on Apr. 30, 1991, the full disclosure of which is incorporated herein by reference. The row unit support frame 60 includes a lift assembly 62, a laterally elongated tool bar 64, and individual mounting structures 66 associated with and connecting each harvesting unit to the tool bar 64.

As illustrated in FIG. 1, harvesting units 20 and 28 define an outer pair of harvesting units and which are each laterally movable along and between opposite ends of the tool bar 64. Harvesting units 22 and 26 define an inner pair of harvesting units and which are each laterally movable along and between opposite ends of the bar 64. In the illustrated embodiment, harvesting unit 24 is fixedly secured to bar 64 between harvesting units 22 and 24.

Figure 3:
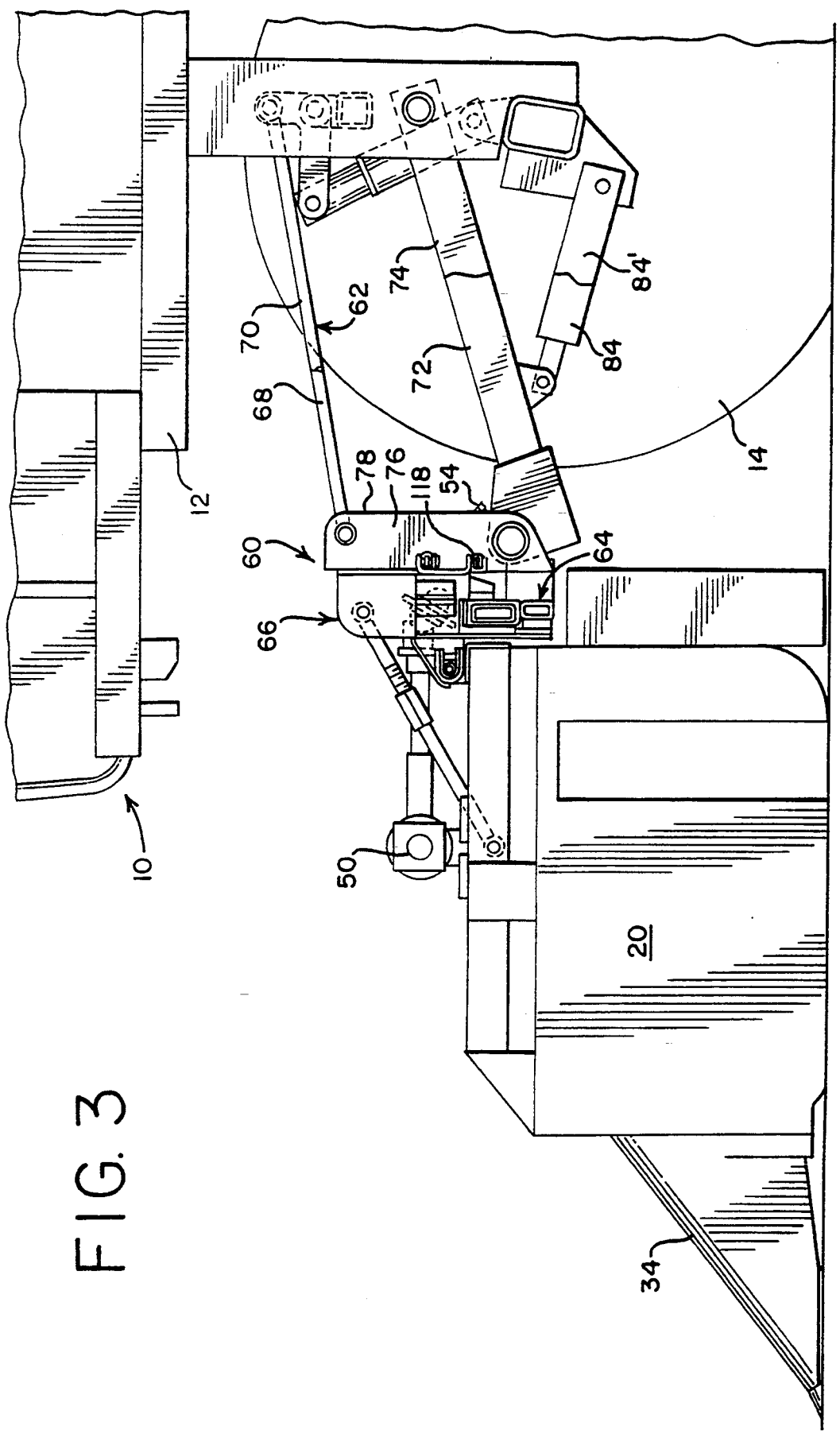
FIG. 3 is a partial side elevational view of the cotton harvester illustrated in FIG. 1.

Lift assembly 62 operates as a four-bar parallelogram-type linkage which is pivotally connected to and extends forwardly from the frame 12 for securing the harvesting units to the frame and for permitting vertical displacement of the harvesting units between raised and lowered positions. As illustrated in FIG. 3, lift assembly 62 includes a pair of laterally spaced upper tension arms 68 and 70, which extend generally parallel to a lower pair of laterally spaced lift arms 72 and 74. Rearward ends of the tension arms 68, 70 and lift arms 72, 74 are pivotally attached to the frame 12 in vertically spaced alignment to permit angular displacement thereof relative to the frame.

Forward ends of tension arms 68, 70 and lift arms 72, 74 are pivotally connected in vertically spaced alignment to a pair of lever arms 76 and 78, respectively. The tension arms 68, 70 have an effective length which is approximately equal to that of lift arm 72, 74, respectively, and therefore the harvesting units connected thereto are maintained in a generally level attitude during field operation as they are raised and lowered relative to the frame 12.

As illustrated in FIG. 3, the lift assembly 62 further includes linearly distendable drivers 84 and 84' for adjusting the angular position of the lift arms 72 and 74, respectively, relative to frame 12 and thereby conjointly adjusting the vertical position of the harvesting units 20 through 28 relative to the frame. Preferably, drivers 84, 84' are in the form of hydraulic cylinders. The cylinder end of each driver is pivotally connected to the frame 12. The rod end of driver 84 is pivotally connected to the lift arm 72, while the rod end of driver 84' is pivotally connected to the lift arms 74. As will be appreciated, the operative length of the hydraulic cylinder will control the angular disposition of the lift assembly and thereby the harvesting units connected to the tool bar 64.

Figure 4:
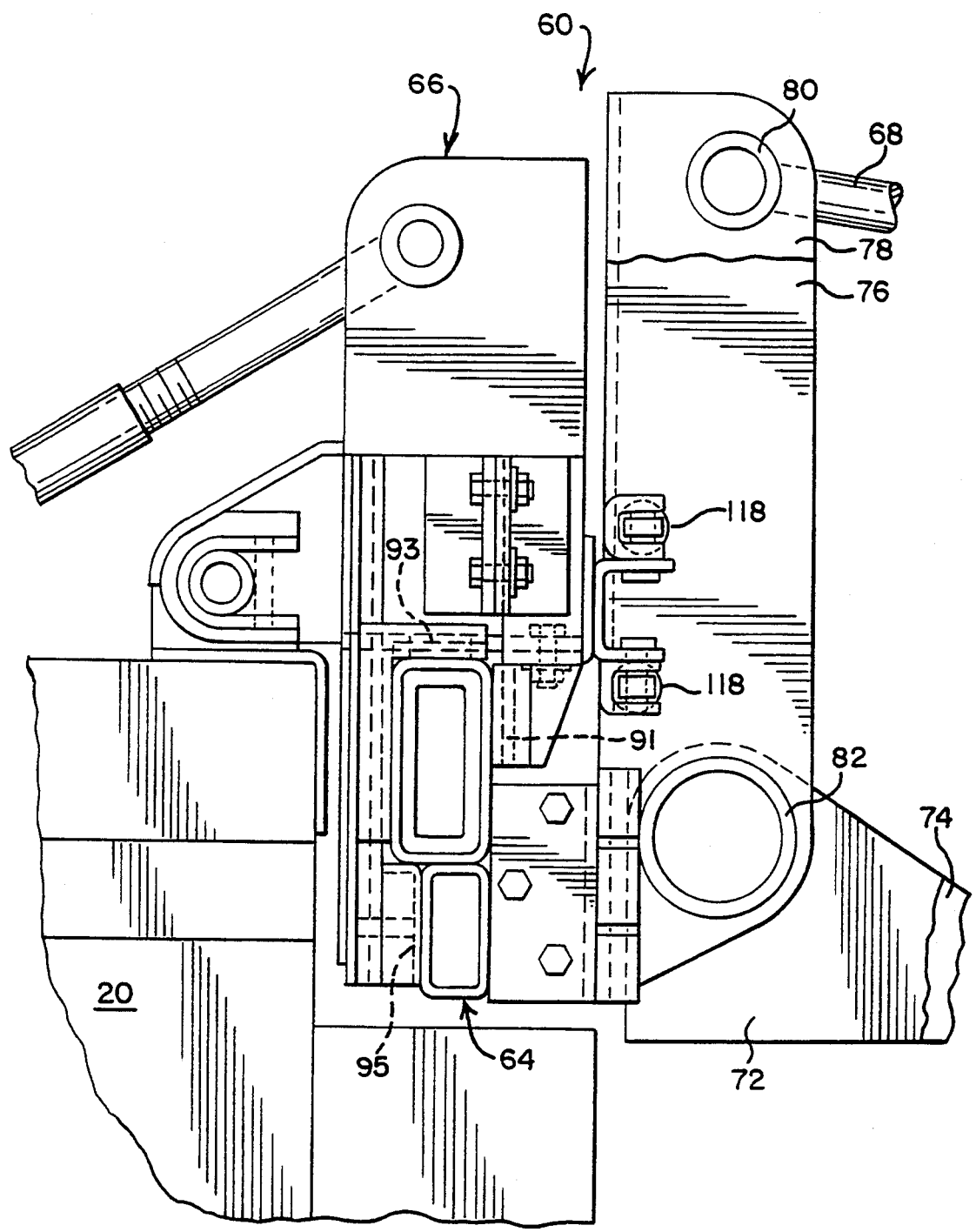
FIG. 4 is an enlarged fragmentary side elevational view of the mounting assembly for supporting and connecting the harvesting unit to a frame of the cotton harvester.

In the illustrated embodiment, the elongated tool bar 64 is comprised of one or more laterally elongated structural members connected to and extending laterally across lever arms 76, 78. Preferably, and as seen in FIG. 4, tool bar structure 64 is formed from rectangularly-shaped tubes which are welded or otherwise secured together one on top of another and which extend across the forward end of the frame 12.

The individual mounting structures 66 connect the harvesting units to the bar 64 in a manner allowing independent lateral movement of the harvesting units relative to each other while preventing fore-and-aft movements of the harvesting units relative to the support frame. In the illustrated embodiment, the mounting structure 66 is advantageously provided toward a rear portion of the harvesting unit. The rearward location of the mounting structure advantageously permits each harvesting unit to hang off of and forwardly from the tool bar 64 in a manner providing increased access between the units and unobstructed operator visibility to the forward end of the harvesting unit from a cab region on the harvesting unit.

The mounting structure 66 for each movable harvesting unit is substantially identical in construction. In the illustrated embodiment, the mounting structure 66 is connected to and extends upwardly from each movable harvesting unit. Preferably, the mounting structure 66 embraces the tool bar 64 of the support frame to allow for lateral movements of the movable harvesting units therealong. The illustrated form of the mounting structure is merely exemplary in that other forms of mounting structures are equally applicable without detracting from the spirit and scope of the present invention. Notably, each mounting structure 66 includes a series of slider pads 91, 93 and 95 to further promote lateral movement of the harvesting units along the tool bar 64.

Powered lateral movement of each movable row unit along the length and between opposite ends of bar 64 can be effected through any suitable form of actuator. A rack and pinion assembly could be used for effecting lateral powered movement of the harvesting units. Actuation of such a rack and pinion arrangement could be effected through a suitably powered motor fitted to the respective pinion to achieve the desired movement for the harvesting unit. A selectively driven motor with an elongated rotatable screw actuator is an alternative apparatus for linearly moving the harvesting unit.

The preferred embodiment of the present invention uses a linearly distendable hydraulic cylinder or actuator 118 to linearly move a harvesting unit along the length of the tool bar 64. In a most preferred form of the invention, each hydraulic cylinder is in the form of a double-acting hydraulic cylinder such that the actuator 118 conjointly acts to positively position the movable harvesting unit along the length of the bar 64. The cylinder end of each actuator 118 is pivotally connected to the bar 64. The rod end of each actuator 118 extends toward and is connected to a respective movable harvesting unit.

Figure 5:
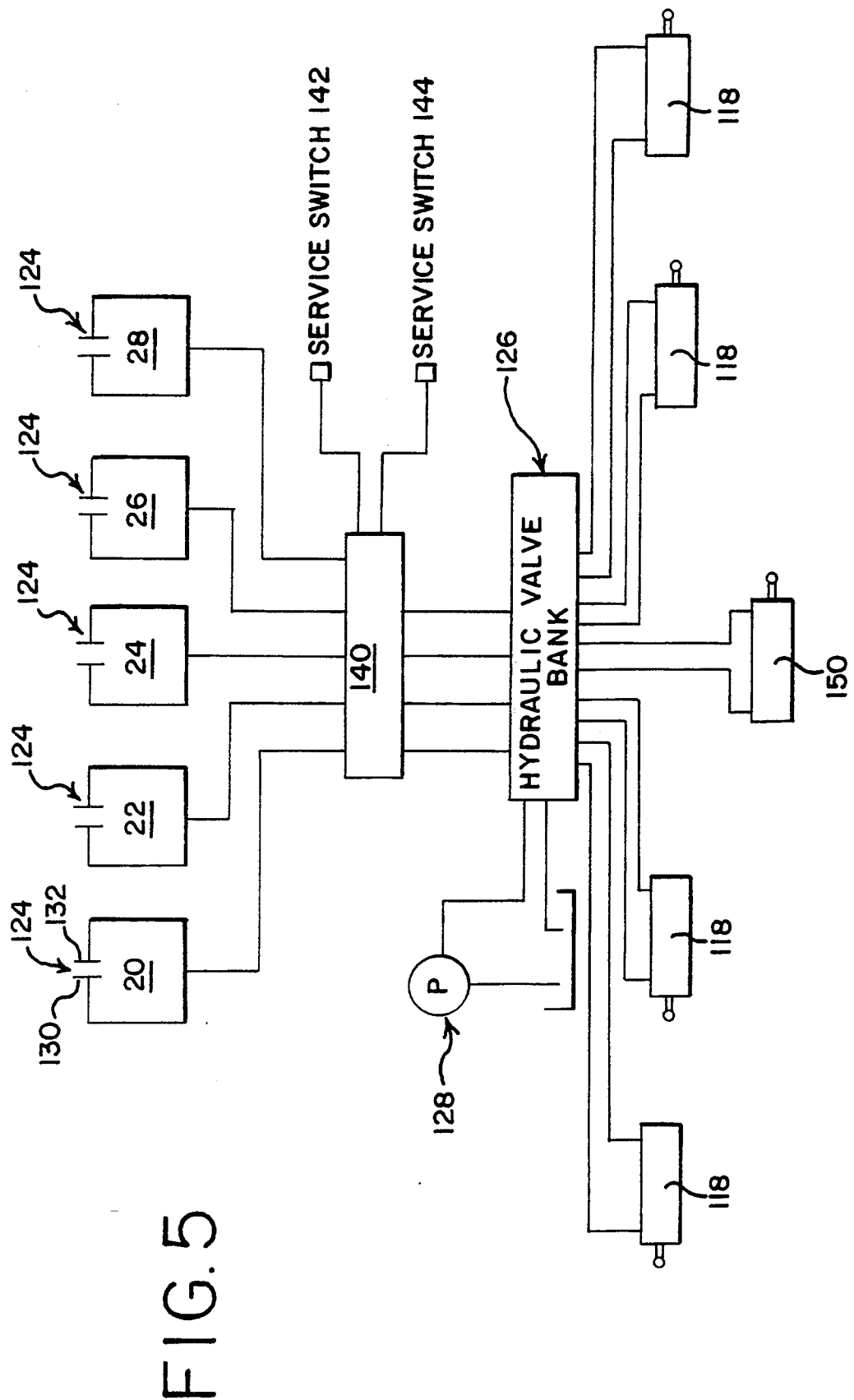
FIG. 5 is a schematic view illustrating circuitry for automatically positioning the harvesting units of the cotton harvester.

As shown in FIG. 5, each movable harvesting unit is positioned under the influence of a sensor 124 which controls operation of the actuator 118 associated with the respective movable harvesting unit. Each sensor 124 senses the lateral position of the harvesting unit relative to a desired path on the field. In the illustrated embodiment, each sensor 124 is mounted on a movable harvesting unit for sensing the lateral position of the plant passage of a respective harvesting unit relative to a respective plant row passing therethrough. The sensors 124 are connected through a well known hydraulic valve bank 126 to the actuators 118. In the illustrated embodiment, the hydraulic valve bank 126 selectively permits fluid flow from a suitable pressure source 128 on the harvester, i.e., a hydraulic pump, to each of the actuators 118 under the influence of the sensors 124.

Each sensor 124 can be mechanical, microwave operated, ultrasonic, photosensitive or any combination of other conventional known type sensor arrangements. Each sensor 124 preferably includes first and second sensor elements 130 and 132 arranged on opposite sides of the desired path which the row unit is to track. The first sensor element 130 controls a respective actuator 118 to move a row unit in a first linear direction while the second sensor element 132 controls a respective actuator 118 to linearly move the row unit in a second linear direction opposite to that of the first linear direction.

As shown in FIG. 5, a control assembly 140 is provided between the sensors 124 and the actuators 118. The purpose of the control assembly 140 is to operate the actuators 118 in either a service mode of operation or an operational mode. In an operational mode, each actuator 118 automatically positions the respective row unit relative to a respective row of plants in response to outputs from the sensors 124 mounted on that row unit. In a service mode, the actuator 118 are operated to move their respective row units between an operating position, whereat the row unit is positioned proximate to an adjacent row unit for purposes of harvesting materials from the plants, and a service position whereat the lateral spacing between adjacent harvesting units is increased to facilitate inspection and servicing of the units.

The control assembly 140 preferably includes a first service switch 142 and a second service switch 144. Service switch 142 is a two-state switch which conjointly controls operation of those actuators 118 associated with the movable harvesting units 20 and 28 in either an operational mode or a service mode. Service switch 144 is likewise a two-state switch which conjointly controls operation of those actuators 118 associated with harvesting units 22 and 26 in either an operational mode or a service mode.

When the cotton harvester is being transported, harvesting units 20 through 28 are preferably carried in a raised position. By actuating drivers 84, 84', the lift arms 72, 74 are caused to pivot the tool bar 64 into a raised or transport position. Because the harvesting units 20 through 28 are individually connected to the tool bar structure 64, they too are vertically raised into a transport position.

In preparation for harvesting, drivers 84, 84' are operated to allow the lift arms 72, 74 to pivot downward. Downward movement of the lift arms 72, 74 results in the tool bar structure 64 and thereby the harvesting units carried thereon being lowered. The ultimate vertical position of the harvesting units is controlled by adjusting the operative or effective lengths of the drivers 84, 84' during a harvesting operation.

During a harvesting operation, and with the control assembly 140 being conditioned to allow the actuators 118 to function in an operational mode, the sensor 124 on each harvesting unit controls the respective actuator 118 to align the movable harvesting unit with respect to the respective plant row thereby facilitating harvesting of the cotton by the harvesting mechanism of the movable harvesting unit. In the preferred form of the invention, and with the control assembly 140 being set to allow the actuators 118 to function in an operational mode, each sensor 124 senses the lateral position of the plant passage on the movable harvesting unit relative to a respective plant row passing therethrough and controls a respective actuator 118 to align the plant passage on the movable harvesting unit relative to the respective plant row thereby improving the harvesting ability of the movable harvesting unit by centralizing the plant passage of the respective row unit on the plant row thereby maximizing the effectiveness of the harvesting mechanism of the harvesting unit.

With the present invention, the sensors 124 individually align the movable harvesting units relative to the plant row rather than moving all of the harvesting units relative to a particular plant row. The improved responsiveness inherent with moving one harvesting unit rather than correcting the direction of travel of the harvester through the steering mechanism is readily apparent. Moreover, the automatic guiding of the row units relative to a predetermined path of travel significantly reduces operator involvement and thereby reduces stress on the operator during the harvesting operation. Because the operator is not required to correct the direction of the harvester during a harvesting operation, the automatic guiding of the row unit, inherent with the present invention, furthermore allows the ground speed of the harvester to be increased thus increasing harvesting capacity.

As mentioned above, row or harvesting unit 24 is fixedly secured to bar 64 between row units 22 and 26. An attractive advantage of the present invention is that it is readily adaptable for use with an automatic steering mechanism of the type described herein above. If so desired, a sensor 124 can be mounted on the row unit 24 to control operation of a steering cylinder 150 forming part of an automatic steering system. Unlike the other known steering systems, however, the present invention allows for automatic and powered lateral movement of the harvesting units other than row unit 24. Accordingly, automatic steering can be used to center row unit 24 on the respective plant passage while the present invention allows for independent powered movement of the remaining harvesting units on bar 64.

The present invention also allows for servicing and inspection of the harvesting units. When inspection is required, the control assembly 140 is set to allow the actuators 118 to function in a service mode of operation. Thereafter, either switch 142, 144 can be set to move the harvesting units a predetermined lateral distance under the influence of the actuators 118 thus setting the position of the harvesting units at a predetermined lateral distance to allow the operator access between the units. As will be appreciated, moving the harvesting units laterally along the length of the tool bar 64 under the influence of the actuator 118 is facilitated by the rollers 91, 93 on each mounting structure 66.

The present invention further lends itself to a method for supporting at least two harvesting units on a mobile frame of a cotton harvester to harvest adjacent and parallel rows of cotton. The method comprises the steps of: mounting two harvesting units on a support frame in an adjacent relationship relative to each other and through independent mountings such that the two harvesting units are prevented from moving in fore-and-aft relative to the support frame and at least one of the harvesting units is laterally movable along a tool bar of the support frame; sensing the lateral position of the movable harvesting unit relative to a respective row of cotton plants and for producing output commands indicative of lateral alignment between the harvesting unit and the respective row of plants; and effecting lateral positioning of the movable harvesting unit along the tool bar in response to the output commands thereby effecting lateral alignment of the movable harvesting unit relative to the respective plant row thus enhancing cotton harvester performance.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

What is claimed is:

1. A system for mounting and supporting a plurality of harvesting units in side-by-side relation relative to each other on a fore-and-aft extending frame of a cotton harvester, each harvesting unit including a harvesting mechanism for removing cotton from plants arranged in generally parallel rows, said system comprising:

a harvesting unit support frame connected to the frame of the cotton harvester and including a generally horizontal bar extending laterally across a forward end of the cotton harvester;

mounting structure for individually mounting the harvesting units on said bar to prevent fore-and-aft movements of the harvesting units relative the support frame, with at least one of the harvesting units being mounted on the bar for lateral movement endwise therealong;

an actuator associated with each movable harvesting unit for effecting powered lateral movement of each movable harvesting unit laterally along said bar: and a sensor mounted on each movable harvesting unit for sensing the lateral position of said movable harvesting unit relative to a respective plant row and for controlling the respective actuator to align said movable harvesting unit with respect to said respective plant row thereby facilitating harvesting of the cotton by the harvesting mechanism of the movable harvesting unit.

2. The mounting and supporting system according to claim 1 wherein said harvesting unit support frame includes a lift assembly connected to and extending from the frame of the harvester to vertically position said generally horizontal bar relative to the harvester frame and thereby conjointly elevationally position the harvesting units connected to said bar.

3. The mounting and supporting system according to claim 1 wherein the mounting structure for at least the movable harvesting unit extends upwardly from and connects a housing of the movable harvesting unit to the bar for movement therealong.

4. The mounting and supporting system according to claim 1 wherein said actuator comprises a hydraulically operated motor for moving and positively positioning the movable harvesting unit in selective lateral positions along the length of the bar.

5. A system for mounting and supporting a plurality of harvesting units in side-by-side relation relative to each other on a fore-and-aft extending frame of a cotton harvester, each harvesting unit including housing structure defining a fore-and-aft extending plant passage and with harvesting structure being housed within the housing structure for harvesting cotton from a row of cotton plants passing through the plant passage of a respective harvesting unit, said system comprising:

a harvesting unit support frame connected to the frame of the cotton harvester and including an elongated bar laterally extending across a forward end of the cotton harvester;

mounting structure for individually connecting the harvesting units to the support frame to prevent fore-and-aft movement of the harvesting units relative thereto, with at least one of the harvesting units being supported and mounted on the bar for lateral movement endwise therealong;

an actuator associated with the movable harvesting unit for effecting linear powered movement in either linear direction and positive positioning of the movable harvesting unit laterally along the bar; and a sensor mounted on each movable harvesting unit for sensing the lateral position of the plant passage on the movable harvesting unit relative to a respective plant row passing therethrough and for controlling a respective actuator to align the plant passage on the movable harvesting unit relative to the respective plant row thereby improving the harvesting ability of the movable harvesting unit.

6. The mounting and supporting system according to claim 5 wherein said harvesting unit support frame includes a lift assembly for connecting the elongated bar on which the harvesting units are mounted to the fore-and-aft frame of the harvester, said lift assembly including motors for vertically moving the bar relative to the frame of the harvester and thereby conjointly effecting the elevation of the harvesting units connected to said bar.

7. The mounting and supporting system according to claim 5 wherein said mounting structure includes an apparatus connected to each movable harvesting unit for embracing the bar of the support frame to allow for sliding movements of the movable harvesting units therealong.

8. The mounting and supporting system according to claim 5 wherein said actuator for effecting movement and positioning of the movable harvesting unit comprises a linearly distendable hydraulic cylinder connected between the support frame and the movable harvesting unit.

9. A system for mounting row units on an agricultural implement suitable for movement across a field, said mounting system comprising:
   a row unit support frame connected to said agricultural implement and including a generally horizontal bar;
   an apparatus for individually mounting the row units on the support frame in laterally adjacent relation relative to each other and such that the row units are prevented from moving in a fore-and-aft relation relative to the support frame, with at least one of the row units being mounted for lateral movement along the bar and relative to an adjacent row unit;
   an actuator for effecting lateral powered movement of a respective movable row unit along the bar; and
   a sensor for monitoring the lateral position of each movable row unit relative to a desirable path on the field and for controlling operation of said actuator to generally align each movable row unit relative to said desirable path.

10. The mounting system according to claim 9 wherein said apparatus for individually mounting the row units comprises a mounting assembly carried by each movable harvesting unit to allow for lateral movements along the length of said horizontal bar, said mounting assembly including rollers for facilitating movement of the row unit relative to said bar.

11. The mounting system according to claim 9 wherein the actuator associated with each movable row unit comprises a hydraulically operated and linearly distendable cylinder connected between said support frame and the movable row unit, and wherein the linear distention of said cylinder controls the position of the row unit along the length of said bar.

12. The mounting system according to claim 9 further including a controller connected to the motor for each movable row unit for disengaging the sensor therefrom and selectively operating the actuator in a service mode to allow for inspection and servicing of the movable row unit.

13. The mounting system according to claim 9 wherein each sensor includes first and second sensor elements arranged on opposite sides of the desirable path on the field, said first sensor element of each sensor controls a respective actuator to move the row unit in a first linear direction while the second sensor element of each sensor controls said respective motor to move the row unit in a second linear direction.

14. A system for mounting a pair of outer and a pair of inner row units on a forward end of an agricultural harvester for harvesting materials from a plurality of parallel and adjacent rows of plants, said system comprising:
   a row unit support frame connected to the forward end of the harvester for generally vertical movements and including a tool bar having first and second ends;
   structure for individually supporting each row unit on the support frame in laterally adjacent relation relative to each other and such that the row units are prevented from moving fore-and-aft relative to the support frame, and wherein a majority of the row units are connected to the support frame for independent lateral movement relative to an adjacent row unit and between the ends of the tool bar;
   a sensor for monitoring lateral alignment of the movable row units relative to the respective plant row and developing an output signal indicative of the lateral alignment therebetween;
   an actuator associated with each of the movable row units for effecting linear movement of the respective row units between the ends of the tool bar;
   a control system for selectively operating said actuators in either a service mode or an operational mode, wherein in an operational mode each actuator automatically positions the respective row unit relative to a respective row of plants in response to outputs from the sensor mounted on that row unit, and wherein in a service mode a pair of row units is moved between an operating position, whereat each row unit of said pair of row units is positioned proximate to an adjacent row unit for purposes of harvesting materials from the plants, and a service position whereat the lateral spacing between adjacent harvesting units is increased to facilitate inspection and servicing of the units.

15. A system for mounting a pair of outer and a pair of inner row units on a forward end of an agricultural harvester for harvesting materials from a plurality if parallel and adjacent rows of plants, said system comprising:
   a row unit support frame connected to the forward end of the harvester for generally vertical movements and including a tool bar having first and second ends;
   structure for individually supporting each row unit on the support frame in laterally adjacent relation relative to each other and such that the row units are prevented from moving fore-and-aft relative to the support frame, and wherein the row units are individually connected to the support frame for lateral movement relative to an adjacent row unit and between the ends of the tool bar;
   a sensor for monitoring lateral alignment of the movable row units relative to the respective plant row and developing an output signal indicative of the lateral alignment therebetween;

actuators associated with the movable row units for effecting linear movement of the respective row units between the ends of the tool bar;

a control system for selectively operating said actuators in either a service mode or an operational mode, wherein in an operational mode each actuator automatically positions the respective row trait relative to a respective row of plants in response to outputs from the sensor mounted on that row unit and wherein in a service mode a pair of row units is moved between an operating position, whereat each row unit of said pair of row units is positioned proximate to an adjacent row unit for purposes of harvesting materials from the plants, and a service position whereat the lateral spacing between adjacent harvesting units is increased to facilitate inspection and servicing of the units, and wherein said control system includes a first selectively operable switch for operatively disconnecting the sensors on the outer pair of harvesting units from the actuator associated therewith and for conjointly operating the actuators associated with the pair of outer harvesting units in a predetermined manner, and a second selectively operable switch for operatively disconnecting the sensors on the inner pair of harvesting units from the actuators associated therewith and for conjointly operating the actuators associated with the inner pair of harvesting units in a predetermined manner.

16. The mounting system according to claim 14 wherein said actuator for linearly moving a movable harvesting unit comprises a hydraulically operated motor connected to the support frame and to a movable harvesting unit.

17. A method for supporting harvesting units on a mobile frame of a cotton harvester to harvest adjacent and parallel rows of cotton plants, said method comprising the steps of:

mounting said harvesting units on a support frame in an adjacent relationship relative to each other and through independent mounting structure such that said harvesting units are prevented from moving in fore-and-aft relative to the support frame, with at least one of the harvesting units being laterally movable along a bar of the support frame;

sensing the lateral position of the movable harvesting unit relative to a respective row of cotton plants and for producing output commands indicative of lateral alignment between said movable harvesting unit and said respective row of plants; and effecting powered lateral movement of said movable harvesting unit along said bar in response to the output commands thereby effecting lateral alignment of the movable harvesting unit relative to the respective plant row thus enhancing cotton harvester performance.

18. A method for supporting row units on an agricultural implement equipped for movement across a field, said method comprising the steps of:

mounting the row units on a generally horizontal tool bar in adjacent relationship relative to each other and through independent mountings such that at least one of the row units is laterally movable along said tool bar and relative to said adjacent row unit;

sensing the lateral position of the movable row unit relative to a desirable path on the field and for producing output signals indicative of lateral alignment between said movable row unit and the desirable path; and effecting powered lateral movement of the movable row unit along said tool bar in response to the output signals thereby effecting general lateral alignment of the row unit relative to the desirable path on the field.

* * * * *